(12) United States Patent
Kang

(10) Patent No.: US 8,036,569 B2
(45) Date of Patent: Oct. 11, 2011

(54) IMAGE FORMING APPARATUS HAVING CO-PLANER TOP COVER AND OPERATION PANEL

(75) Inventor: Kwan-ho Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 855 days.

(21) Appl. No.: 11/970,013

(22) Filed: Jan. 7, 2008

(65) Prior Publication Data

US 2008/0252946 A1 Oct. 16, 2008

(30) Foreign Application Priority Data

Apr. 16, 2007 (KR) ........................ 10-2007-0037144

(51) Int. Cl.
*G03G 15/00* (2006.01)
(52) U.S. Cl. ......... 399/107; 399/125; 399/379; 399/380
(58) Field of Classification Search .................. 399/107, 399/81, 125, 379–380
See application file for complete search history.

(56) References Cited

U.S. PATENT DOCUMENTS

| | | | | |
|---|---|---|---|---|
| 4,616,269 A * | 10/1986 | Mori | .............................. | 358/496 |
| 4,831,457 A * | 5/1989 | Watanabe et al. | ............. | 358/401 |
| 4,873,579 A * | 10/1989 | Kubota et al. | ................. | 358/471 |
| 4,994,988 A * | 2/1991 | Yokoi | ........................... | 358/1.13 |
| 5,006,934 A * | 4/1991 | Hashimoto et al. | ........... | 358/296 |
| 5,382,998 A * | 1/1995 | Shida et al. | ..................... | 355/50 |
| 5,532,826 A * | 7/1996 | Miyao et al. | | |
| 5,907,413 A * | 5/1999 | Han | .............................. | 358/497 |
| 6,177,739 B1 * | 1/2001 | Matsudaira et al. | .......... | 307/125 |
| 7,057,756 B2 * | 6/2006 | Ogasahara et al. | .......... | 358/1.15 |
| 7,405,847 B2 * | 7/2008 | Short et al. | ..................... | 358/474 |
| 7,551,332 B2 * | 6/2009 | Itoi | ............................... | 358/497 |
| 7,728,824 B2 * | 6/2010 | Morioka | ....................... | 345/173 |
| 7,773,903 B2 * | 8/2010 | Kao | ............................... | 399/81 |
| 7,798,407 B2 * | 9/2010 | Hall et al. | ...................... | 235/454 |
| 7,894,738 B2 * | 2/2011 | Muraki | .......................... | 399/81 |
| 2003/0039481 A1 | 2/2003 | Suzuki | | |
| 2005/0134726 A1 | 6/2005 | Parulski et al. | | |
| 2005/0185228 A1 * | 8/2005 | Seo | | |
| 2006/0083542 A1 * | 4/2006 | Ito | ................... | 399/107 |
| 2006/0085946 A1 * | 4/2006 | Hattori et al. | | |
| 2006/0093210 A1 * | 5/2006 | Tomura | | |
| 2006/0246866 A1 * | 11/2006 | Nakagawa et al. | ........... | 455/301 |

(Continued)

FOREIGN PATENT DOCUMENTS

CN 1921541 2/2007

(Continued)

OTHER PUBLICATIONS

English translation of Kirita (JP 2001-320550 A).*

(Continued)

*Primary Examiner* — David Gray
*Assistant Examiner* — Geoffrey Evans
(74) *Attorney, Agent, or Firm* — Staas & Halsey LLP

(57) ABSTRACT

An image forming apparatus has a first body with a scanner and an operation panel disposed on one side of the scanner. A top surface of the scanner and a top surface of the operation panel are in a same plane. A second body is disposed below the first body, to support the first body. The first body rotates between open and closed positions relative to the second body.

18 Claims, 5 Drawing Sheets

U.S. PATENT DOCUMENTS

| | | | |
|---|---|---|---|
| 2006/0268027 A1 * | 11/2006 | Lim | 347/9 |
| 2006/0291896 A1 | 12/2006 | Woo et al. | |
| 2007/0228644 A1 * | 10/2007 | Muraki et al. | 271/157 |
| 2007/0285741 A1 * | 12/2007 | Sato et al. | 358/497 |
| 2008/0044197 A1 * | 2/2008 | Muraki | 399/81 |
| 2008/0199201 A1 * | 8/2008 | Kohara et al. | 399/81 |

FOREIGN PATENT DOCUMENTS

| | | | |
|---|---|---|---|
| EP | 1 748 637 A1 * | 1/2007 | |
| JP | 11215278 A * | 8/1999 | |
| JP | 2001320550 A * | 11/2001 | |
| JP | 2005-070816 | 3/2005 | |
| JP | 2006-199458 | 8/2006 | |

OTHER PUBLICATIONS

English machine translation of Japanese reference, Kubo (JP 11215278 A).*

European Search Report issued in European Patent Application No. 08101355.9 on Jul. 24, 2008.*

Communication Pursuant to Article 94(3) EPC, mailed Jul. 6, 2010, in corresponding European Application 08101355.9.

Patent Abstract, Chinese Publication No. 1921541, Published Feb. 28, 2007.

Chinese Office Action dated Apr. 19, 2011 in Application No. 200810005690.4.

* cited by examiner

IMAGE FORMING APPARATUS HAVING CO-PLANER TOP COVER AND OPERATION PANEL

CROSS-REFERENCE TO RELATED APPLICATION

This application claims the benefit of Korean Application No. 2007-37144, filed Apr. 16, 2007 in the Korean Intellectual Property Office, the disclosure of which is incorporated herein by reference.

BACKGROUND OF THE INVENTION

1. Field of the Invention

Aspects of the present invention relate to an image forming apparatus, and more particularly, to an image forming apparatus having a scanning function.

2. Description of the Related Art

Image forming apparatuses that provide scanning features generally include scanning units and printing units. The scanning units scan a document and convert the scanned document to a digital image. The printing units form an image corresponding to print received printing data on a printing medium.

Flatbed-type scanners are widely used as scanning units. The flatbed-type scanner scans a document placed flat on a glass substrate, and, as such, the dimensions of the floor space or footprint of the scanner are greater than those of the document to be scanned. Further, it is difficult to reduce the dimensions of the scanning unit so as to decrease the footprint of the image forming apparatus with respect to the floor space. However, the printing unit may perform printing while bending a printing medium and moving the printing medium along a curved printing path. Accordingly, it is possible to make a length of the floor space (i.e., footprint) of the printing unit less than a length of the printing medium, the length of the printing medium being with respect to a direction in which the printing medium moves. As such, the dimensions of the floor space of the printing unit may be less than those of the scanning unit.

FIG. 1 is a perspective view of a conventional image forming apparatus 1 having a scanning function. In FIG. 1, the conventional image forming apparatus 1 includes a printing unit 5 and a scanning unit 3 disposed above the printing unit 5. The scanning unit 3 of the conventional image forming apparatus 1 of FIG. 1 has larger dimensions in a horizontal direction than the printing unit 5. In other words, a periphery of the scanning unit 3 extends further in some or all horizontal directions than a periphery of the printing unit 5. As described above, a flatbed-type scanner is used as the scanning unit 3, and the scanning unit 3 may not have the same dimension of the floor space as the printing unit 5. Further, an operation panel 7 arranged to operate the image forming apparatus 1 is disposed at a side of the scanning unit 3, which increases further the horizontal dimensions of the scanning unit 3.

Reduction of the size of the conventional image forming apparatus 1 configured as described above is limited due to the size requirements of the scanning unit 3. Additionally, in the conventional image forming apparatus 1, a top surface of a scanner of the scanning unit 3 is not horizontally aligned with a top surface of the operation panel 7 making for a surface on which it is difficult to place and stably support another object. As such, the space in which the conventional image forming apparatus 1 is mounted is not usable.

SUMMARY OF THE INVENTION

Aspects of the present invention relate to an image forming apparatus which has a single flat top surface and can have a decreased size with respect to a conventional image forming apparatus.

According to aspects of the present invention, there is provided an image forming apparatus including a first body comprising a scanner and an operation panel disposed at a side of the scanner in which a top surface of the scanner and a top surface of the operation panel are on a same plane; and a second body disposed below the first body to support the first body so that the first body can rotate between open and closed positions.

According to aspects of the present invention, the operation panel may be arranged at the side of the scanner in a longitudinal direction of the scanner.

According to aspects of the present invention, the operation panel may include a panel cover, an indicating unit, and operation buttons which are disposed below the panel cover.

According to aspects of the present invention, top surfaces of the indicating unit and the operation buttons may be horizontally aligned with a top surface of the panel cover.

According to aspects of the present invention, if the image forming apparatus is turned on, the indicating unit and the operation buttons may be illuminated, and if the image forming apparatus is turned off, the indicating unit and the operation buttons may become dark.

According to aspects of the present invention, a scanning position indicating member may be disposed between the scanner and the operation panel.

According to aspects of the present invention, the first body may have the same width and length as the second body.

According to aspects of the present invention, the first body may include a first cover and a first frame disposed inside the first cover.

According to aspects of the present invention, a scanning cover of the scanner and the panel cover of the operation panel may be in the same plane on a top surface of the first cover.

According to aspects of the present invention, a plurality of cover fastening hooks may be disposed on the top surface of the first cover to secure the panel cover thereto.

According to aspects of the present invention, a scanning position indicating slit may be disposed between the scanning cover and the panel cover, and the scanning position indicating member may be disposed on an upper side of the scanning position indicating slit.

According to aspects of the present invention, a plurality of fastening hooks may be disposed around the scanning position indicating slit to secure the scanning position indicating member thereto.

According to aspects of the present invention, the scanning module may be movably disposed on a reference surface of the first frame, and an outside surface of the first frame may be configured so that one of two sides, which face each other, of the outside surface of the first frame in a moving direction of the scanning module may not protrude above the reference surface of the first frame.

According to aspects of the present invention, the scanning module may be movably disposed on a reference surface of the first frame, and an outside surface of the first frame may be configured so as to not protrude above the reference surface of the first frame.

According to aspects of the present invention, supporting members may be disposed on the reference surface of the first frame to support a glass substrate.

According to aspects of the present invention, an exposure unit may be disposed below the reference surface of the first frame.

According to aspects of the present invention, a scanning unit may be disposed in the first body, and a printing unit may be disposed in the second body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
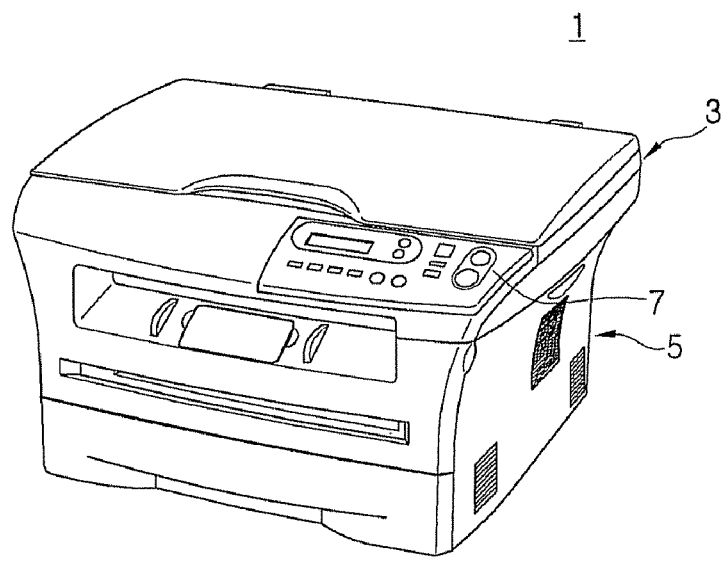
FIG. 1 is a perspective view of a conventional image forming apparatus.

Reference will now be made in detail to exemplary embodiments of the present invention, examples of which are illustrated in the accompanying drawings, wherein like reference numerals refer to the like elements throughout. The exemplary embodiments are described below in order to explain the present invention with reference to the figures.

Figure 2:
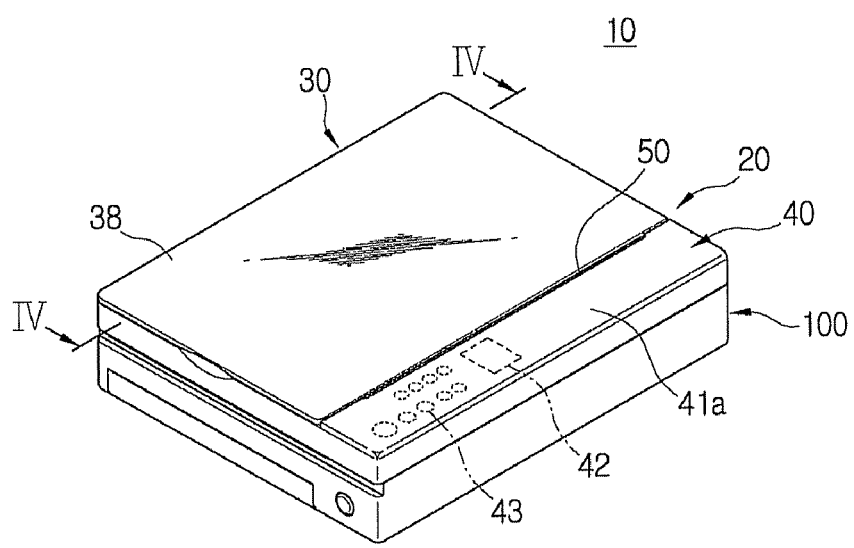
FIG. 2 is a perspective view of an image forming apparatus according to an exemplary embodiment of the present invention.
Figure 3:
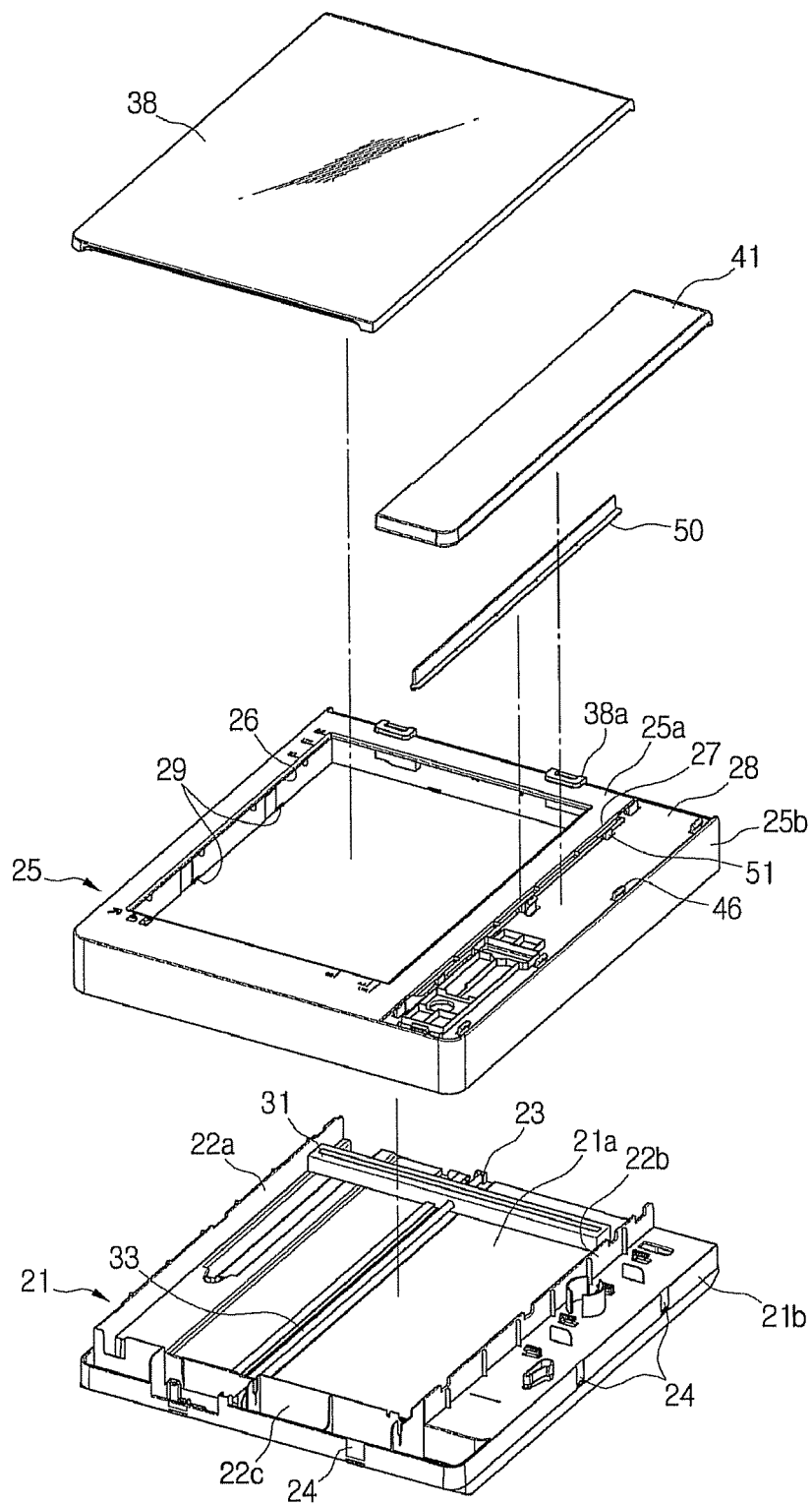
FIG. 3 is an exploded perspective view of a scanning unit of the image forming apparatus of FIG. 2.

FIG. 2 is a perspective view of an image forming apparatus 10 according to an exemplary embodiment of the present invention, and FIG. 3 is an exploded perspective view of a scanning unit of the image forming apparatus of FIG. 2. In FIG. 2, the image forming apparatus 10 according to an embodiment of the present invention includes a first body 20, and a second body 100 disposed below the first body 20. As shown in FIG. 2, the first body 20 has a substantially planar top surface. The first body 20 includes a scanner 30 to scan a document, and an operation panel 40 through which a user can input commands to control the image forming apparatus 10. Accordingly, the first body 20 may include scanning unit to scan a document. Further, the image forming apparatus 10 according to aspects of the present invention may be a printer, a facsimile machine, a scanner, or a multifunction unit.

Figure 4:
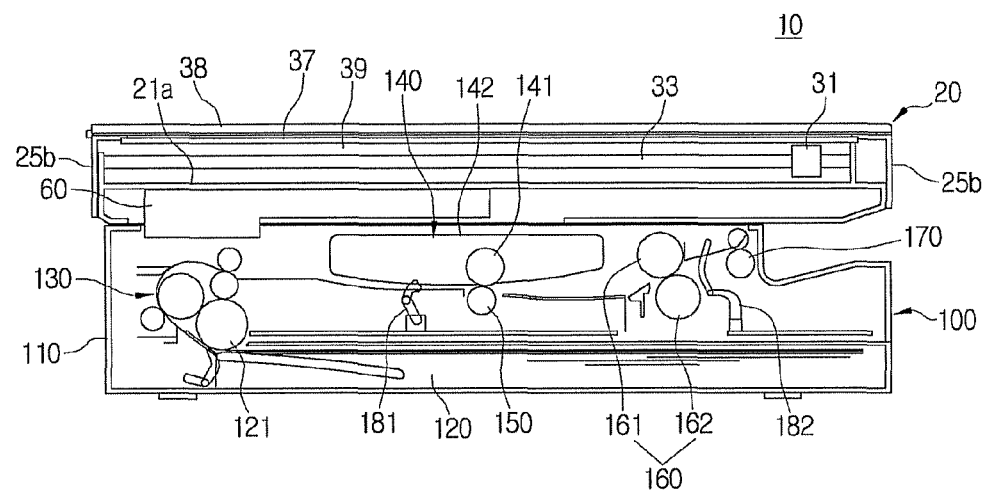
FIG. 4 is a sectional view taken along line IV-IV of the image forming apparatus of FIG. 2.
Figure 6:
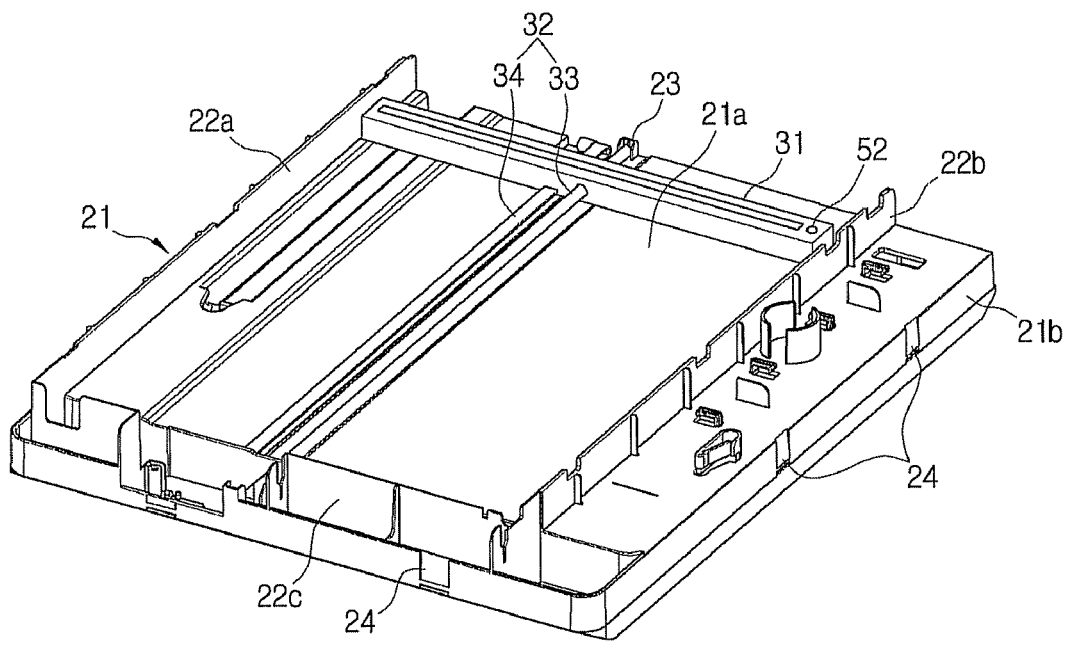
FIG. 6 is a perspective view of a first frame of the scanning unit of FIG. 3.
Figure 7:
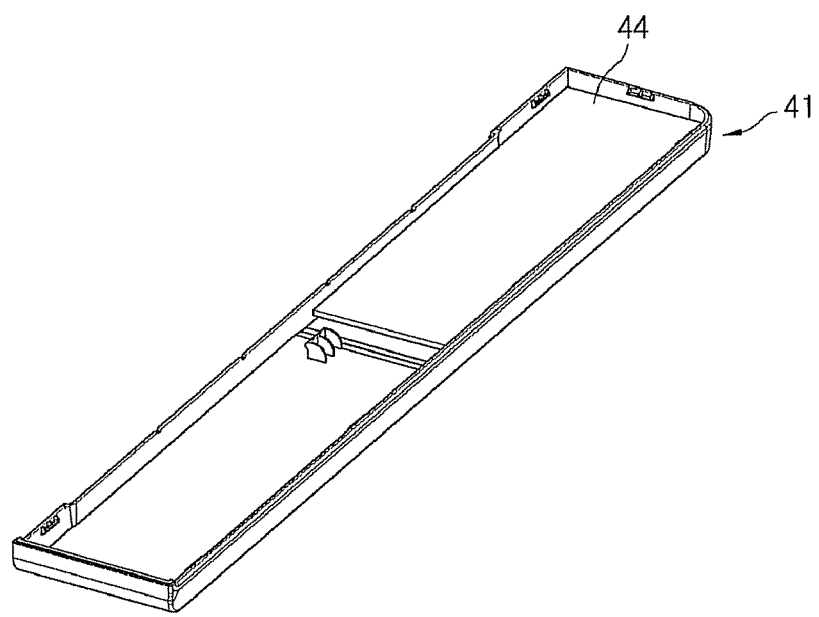
FIG. 7 is a bottom perspective view of a panel cover of the scanning unit of FIG. 3.

The scanner 30 includes a scanning module 31 disposed in the first body 20 to linearly move with respect to a document and having a plurality of image sensors to scan the document, a module moving unit 32 (as shown in FIG. 6) disposed in the first body 20 to cause the scanning module 31 to move, a glass substrate 37 (as shown in FIG. 4) to support a document to be scanned, and a scanning cover 38 to cover the document placed on the glass substrate 37. The module moving unit 32 includes a moving axis 33, a belt 34 and a scan motor (not shown) so that the scanning module 31 can move linearly with respect to the first body 20. The scanning module 31 moves linearly in a longitudinal direction or along a length of the first body 20 substantially parallel to the moving axis 33.

As shown in FIG. 2, the operation panel 40 is disposed on a side of the scanner 30. The operation panel 40 includes an indicating unit 42 to display information regarding a state of the image forming apparatus 10 and information required to control the image forming apparatus 10, and operation buttons 43, which a user can press to control the image forming apparatus 10. The operation panel 40 may be disposed on one side in the longitudinal direction of the scanner 30 (i.e., in a direction substantially parallel to a direction in which scanning module 31 moves, or substantially parallel to the moving axis 33). While shown as a set of buttons 43 separate from the indicating unit 42, it is understood that the buttons 43 and the indicating unit 42 can be combined in aspects, such as where a touch screen display is used.

The first body 20, in which the scanner 30 and operation panel 40 are disposed, includes a first frame 21 and a first cover 25 disposed above the first frame 21. Referring to FIG. 6, the first frame 21 has a substantially rectangular shape and is rotatably coupled to the second body 100. In other words, the first frame 21 is configured to pivot to a predetermined angle relative to the second body 100 so as to be open or closed. As such, the first frame 21 may be rotatably coupled to the second body 100 on any one of the sides nearest supporting members 22a, 22b, and 22c or the side opposite the module moving unit 32 from the supporting member 22c. When the first frame 21 is rotated to an open position, the entire first body 10 is rotated so that features such as the module moving unit 32, the glass substrate 37, the scanning cover 38, and the operation panel 40 are rotated therewith.

The supporting members 22a, 22b, and 22c protrude upwardly from a reference surface 21a of the first frame 21 in order to support the glass substrate 37 (shown in FIG. 4) of the scanner 30. The supporting members 22a, 22b, and 22c protrude from the reference surface 21a of the first frame 21 and are spaced inwardly from an outside surface 21b of the first frame 21 at a predetermined distance. The outside surface 21b of the first frame 21 defines a periphery of the first frame 21 and is arranged about the glass substrate 37 of FIG. 4. In other words, the supporting members 22a and 22b are disposed on the left and right sides, respectively, of the module moving unit 31 including the moving axis 33, which guides the scanning module 31 to move linearly in the longitudinal direction, and the supporting member 22c is disposed at one end of the moving axis 33. Further, the supporting members 22a, 22b, and 22c are disposed between the outside surface of the 21b of the first frame 21 and a scanning opening 26 (i.e., the area through which the scanning module 31 moves) so as to support the glass substrate 37 within the scanning opening 26 above the scanning module 31.

The module moving unit 32 includes the moving axis 33 and a belt 34. An end of the moving axis 33 opposite the supporting member 22c is supported by a fixing unit 23 disposed on the reference surface 21a of the first frame 21. The belt 34 and the scan motor (not shown) cause the scanning module 31 to move in the longitudinal direction and are disposed on a side of the moving axis 33.

The outside surface 21b of the first frame 21 is formed so as to not protrude above the reference surface 21a of the first frame 21, as illustrated in FIG. 6. When the first frame 21 is engaged with the first cover 25, a side surface 25b of the first cover 25 encompasses the periphery or the outside surface 21b of the first frame 21, as shown in FIG. 4. In other words, the side surface 25b of the first cover 25 and the outside surface 21b of the first frame 21 form a side wall of the first body 20 so as to form a space 39 in which the scanning module 31 moves to scan a document. Accordingly, the single side wall 25b is formed to cover the outside surface 21b of the first frame 21 about the space 39 in which the scanning module 31 moves, and thus the length and width of the first body 20 can be minimized.

Although the outside surface 21b of the first frame 21 is formed so as to not protrude above the reference surface 21a of the first frame 21 as describe above, aspects of the present invention are not limited thereto. According to another exemplary embodiment of the present invention, although not illustrated, the outside surface 21b of the first frame 21 may be formed so as to protrude above the reference surface 21a of the first frame 21 on the left and/or right sides about the scanning module 31 along the longitudinal direction, the direction in which the scanning module 31 moves. Alternatively, the outside surface 21b of the first frame 21 may be formed so that one or both of two sides facing each other of the outside surface 21b of the first frame 21 at opposite ends of the longitudinal direction protrude above the reference surface 21a.

Additionally, the outside surface 21b of the first frame 21 extends downwardly from the reference surface 21a of the first frame 21. An exposure unit 60 is disposed under the reference surface 21a of the first frame 21, as shown in FIG. 4. A plurality of grooves 24 into which the first cover 25 is inserted are formed on the outside surface 21b of the first frame 21. As such, when the first body 20 is rotated relative to the second body 100, the exposure unit 60 is also rotated with the first body 20 so as to allow removal, replacement, and/or refilling of the toner in the developing cartridge 140.

Figure 5:
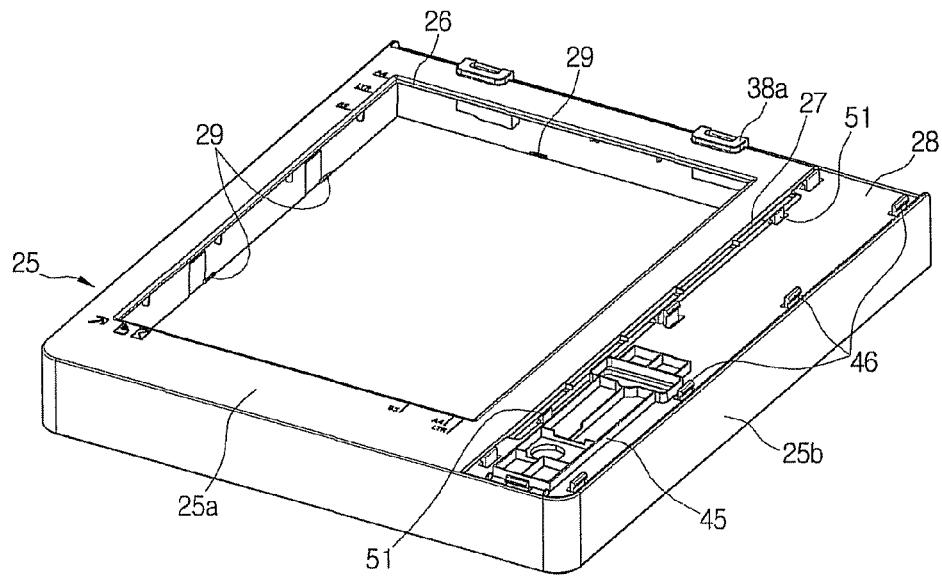
FIG. 5 is a perspective view of a first cover of the scanning unit of FIG. 3.

Referring to FIG. 5, the first cover 25 has a substantially rectangular box shape with an open bottom so as to fit to the first frame 21. A plurality of projections 29, which are inserted into the plurality of grooves 24 of the first frame 21, are disposed on an inside surface of the side surface 25b of the first cover 25. Accordingly, if the first cover 25 is fastened to an upper side of the first frame 21, the space 39 may be formed between the first cover 25 and the first frame 21 so that the scanning module 31 can move therein. The scanning opening 26 in which the glass substrate 37 is fitted is formed on a top surface 25a of the first cover 25. The scanning module 31 moves through the area of the scanning opening 26 to scan a document.

The scanning cover 38 of FIG. 3 is disposed above the scanning opening 26. The scanning cover 38 presses a document placed on the glass substrate 37 to the glass substrate 37 and prevents light emitted from the scanning module 31 from leaking to an outside of the image forming apparatus 10. The scanning cover 38 is connected to the upper side of the first cover 25 by hinges 38a. As the scanning cover 38 is rotatably coupled to the first cover 25, a rotational axis between the scanning cover 38 and the first cover 25 may be different from a rotational axis between the first body 20 and the second body 100 such that the rotational axis between the scanning cover 38 and the first cover 25 may cross the rotational axis between the first body 20 and the second body 100.

A scanning position indicating slit 27 into which a scanning position indicating member 50 is disposed is formed on one side of the scanning opening 26 on the first cover 25. The scanning position indicating slit 27 is disposed in the longitudinal direction parallel to the direction in which the scanning module 31 moves. In the present exemplary embodiment, the scanning module 31 moves lengthwise along a document (i.e., in a top-to-bottom direction), and the scanning position indicating slit 27 can be disposed lengthwise parallel to the document. A plurality of fastening hooks 51 are disposed in a predetermined area of the scanning position indicating slit 27 in order to secure the scanning position indicating member 50. Accordingly, the scanning position indicating member 50 may be easily attached to and detached from the upper side of the first cover 25.

Figure 8:
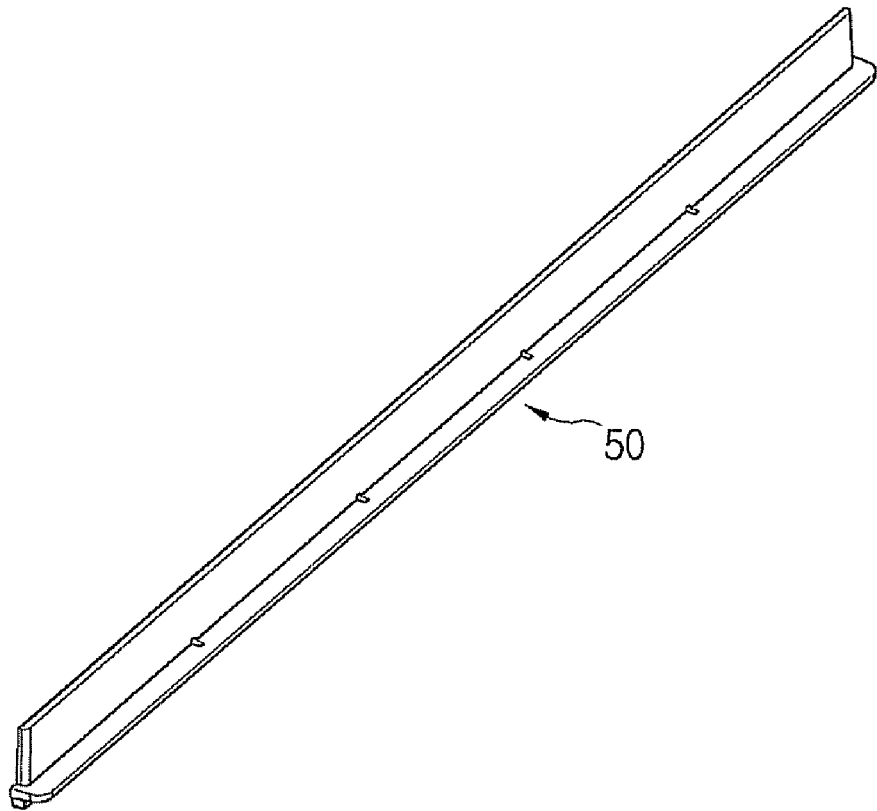
FIG. 8 is a perspective view of a scanning position indicating member of the scanning unit of FIG. 3.

The scanning position indicating member 50 may display light emitted from a scanning position indicating light source 52 disposed in the scanning module 31 so that a user can recognize the light and see a current position of the scanning module 31. Accordingly, as shown in FIG. 8, the scanning position indicating member 50 may have a shape capable of collecting the light emitted from the scanning position indicating light source 52 and emitting the collected light so as to be viewable by the user. The scanning position indicating member 50 may be a lens, a mirror, or an arrangement thereof. As shown in FIG. 6, the scanning position indicating light source 52 is mounted at one end of the scanning module 31 and under the scanning position indicating member 50. The scanning position indicating light source 52 moves integrally with the scanning module 31 so as to indicate the location of the scanning module 31 via the scanning position indicating member 50. However, it is understood that the scanning position indicating member 50 need not be used in all aspects.

Referring again to FIG. 5, an operation panel mounting unit 28 is disposed in the top surface 25a of the first cover 25 on a side of the scanning position indicating slit 27 opposite the scanning opening 26. A plurality of cover fastening hooks 46 are disposed throughout the operation panel mounting unit 28 to fix a panel cover 41 of the operation panel 40. A board support unit 45 is disposed in the operation panel mounting unit 28 to support an operation board 44 of the operation panel 40. The indicating unit 42 is disposed in the operation panel mounting unit 28 to display information regarding the state of the image forming apparatus 10 and information required to control the image forming apparatus 10, and the operation buttons 43 required to control the image forming apparatus 10 are disposed on the operation board 44.

The panel cover 41 has a substantially rectangular box shape with an open bottom. If the panel cover 41 is engaged with the first cover 25, a top surface 41a of the panel cover 41 may be horizontally aligned with the scanning cover 38 in a same plane, as shown in FIG. 2. Accordingly, a top surface of the scanner 30 of the first body 20 may also be horizontally aligned with a top surface of the operation panel 40 in the same plane. Additionally, the panel cover 41 is configured so that the top surfaces of the indicating unit 42 and the operation buttons 43 disposed under the panel cover 41 cannot protrude upwardly above the top surface 41a of the panel cover 41. Therefore, the top surfaces of the indicating unit 42 and the operation buttons 43 may be horizontally aligned with the top surface 41a of the panel cover 41 in the same plane.

Additionally, the entire panel cover 41 may be opaque or semitransparent including a portion in which the indicating unit 42 and the operation buttons 43 are disposed. If electric power is supplied, the indicating unit 42 and the operation buttons 43 may be illuminated. If the image forming apparatus 10 is turned on and electric power is supplied to the operation panel 40, a user can see the indicating unit 42 and the operation buttons 43 and can control the image forming apparatus 10. However, if the image forming apparatus 10 is turned off or asleep (or in a power-save mode), the indicating unit 42 and the operation buttons 43 may disappear or not be illuminated. As such, the panel cover 41 may be transparent.

When the image forming apparatus 10 is turned on, the indicating unit 42 and the operation buttons 43 appear on the top surface 41a of the operation panel 40 of the image forming apparatus 10, as shown in FIG. 2. When the image forming apparatus 10 is turned off, the indicating unit 42 and the operation buttons 43 disappear on the image forming apparatus 10 of FIG. 2, as shown in FIG. 3. As such, the panel cover 41 may be formed of a touch screen display that displays the indicating unit 42 and the operation buttons 43 when the image forming apparatus 10 is turned on.

The second body 100 supports the first body 20 so that the first body 20 can pivot on the second body 100 between open and closed positions. In other words, the first body 20 is rotatably connected to the second body 100, and the first body 20 opens to a predetermined angle. Accordingly, the first body 20 is pivotably disposed above the second body 100 as an upper lid for the second body 100.

A printing unit to form an image on a printing medium is disposed in the second body 100. The second body 100 includes a second cover 110, a printing medium feeding unit 120, a feeding roller unit 130, a developing cartridge 140, a transferring roller 150, a fusing unit 160, and a discharging unit 170. While not required, the printing unit can be a black and white printer, a color printer, and can be used with other types of printing systems beyond a laser printer as shown.

The second cover 110 forms the exterior of the second body 100 and houses the printing medium feeding unit 120, feeding roller unit 130, developing cartridge 140, transferring roller 150, fusing unit 160, and discharging unit 170 disposed therein. If the width of the second cover 110 is equal to that of the first cover 25 of the first body 20, the second body 100 may have the same width as the first body 20. Alternatively, if the length of the second cover 110 is equal to that of the first cover 25 of the first body 20, the second body 100 may have the same width and length as the first body 20.

The printing medium feeding unit 120 stores printing media, such as paper or transparencies, and includes a pickup roller 121 disposed at a leading end of the printing medium feeding unit 120, which picks up the stored printing media one by one and feeds the picked up printing medium to the feeding roller unit 130.

The feeding roller unit 130 includes at least one pair of feeding rollers. The feeding roller unit 130 conveys the printing medium picked up by the printing medium feeding unit 120 along a printing path to travel between the transferring roller 150 and a photosensitive medium 141 of the developing cartridge 140.

The developing cartridge 140 includes a housing 142 and the photosensitive medium 141, which is rotatably disposed inside the housing 142. The developing cartridge 140 develops an electrostatic latent image, which is formed on the photosensitive medium 141 by a laser beam emitted from the exposure unit 60 disposed in the first body 20, into a toner image.

The transferring roller 150 is rotatably disposed to contact the photosensitive medium 141 and transfers the toner image formed on the photosensitive medium 141 onto the printing medium fed from the printing medium feeding unit 120.

The fusing unit 160 is disposed in the second body 100 downstream of the developing cartridge 140 along the printing path. The fusing unit 160 includes a pressing roller 162 and a heating roller 161 and applies heat and pressure to the printing medium passing therethrough. The pressing roller 162 and heating roller 161 fuse the transferred toner image onto the printing medium. The discharging unit 170 discharges the printing medium having the fixed images thereon from the fusing unit 160 to the outside of the image forming apparatus 10.

The image forming apparatus 10 according to the embodiment of the present invention is configured in such a manner that the printing medium moves inside the printing unit of the second body 100 in the same direction as the lengthwise direction of the document placed on the glass substrate 37 of the scanner 30. Accordingly, the width of the first body 20 may be equal to that of the second body 100, and the image forming apparatus 10 may have a minimum width.

Hereinafter, an operation of the image forming apparatus 10 configured according to aspects of the present invention described above will be described with reference to the drawings. A user cannot see the operation buttons 43 or the indicating unit 42 on the image forming apparatus 10 before turning the image forming apparatus 10 on. Additionally, since the top and side surfaces of the image forming apparatus 10 are on the same plane, the image forming apparatus 10 can be recognized only as an object with a substantially rectangular parallelepiped shape. Accordingly, if the exterior of the image forming apparatus 10 (namely, the first cover 25 of the first body 20 and the second cover 110 of the second body 100) is decorated, the image forming apparatus 10 can be used as an ornament for interior decoration. While described as being a parallelepiped shape, it is understood that other prismatic shapes can be used, such as the image forming apparatus 10 having a cross-sectional shape that is oval, triangular, polygonal, or nonregular.

When a user turns the image forming apparatus 10 on, the operation panel 40 of the first body 20 of the image forming apparatus 10 is illuminated so that the user can see the indicating unit 42 and the operation buttons 43. When a user wishes to scan a document, the user opens the scanning cover 38 of the scanner 30, places the document on the glass substrate 37, covers the document with the scanning cover 38, and then presses a specific operation button 43 of the operation panel 40 to thereby start the scanning of the document. However, the document may be scanned while the scanning cover 38 is an open position.

Accordingly, the document placed on the glass substrate 37 can be scanned while the scanning module 31 moves along the moving axis 33. At this time, the user can check the position of the scanning module 31 using the scanning position indicating member 50. Specifically, the scanning position indicating light source 52 disposed at one end of the scanning module 31 emits light while the scanning module 31 moves under the glass substrate 37. Light emitted from the scanning position indicating light source 52 is transmitted by the scanning position indicating member 50 towards the upper side of the image forming apparatus 10. Accordingly, the user can know the current position of the scanning module 31 by observing the position of the light moving on the scanning position indicating member 50. While not required, the scanned document can be transferred to an external computer or personal device using a wired and/or wireless connection.

However, when starting to print a document, a controller (not shown) of the image forming apparatus 10 receives a printing command from a host computer (not shown) connected to the image forming apparatus 10. With reference to FIG. 4, if the printing command is received together with printing data, the controller of the image forming apparatus 10 may operate the exposure unit 60 of the first body 20 to emit a laser beam corresponding to the printing data. The laser beam emitted from the exposure unit 60 enters the photosensitive medium 141 of the developing cartridge 140 disposed in the second body 100 to form an electrostatic latent image on the photosensitive medium 141 corresponding to the printing data. The electrostatic latent image formed on the photosensitive medium 141 is developed into a toner image by toner supplied from the developing roller (not shown). Further, when the printing command is input, the controller of the image forming apparatus 10 may operate the printing medium feeding unit 120 to pick up the stacked printing media one by one and to feed the picked up printing medium to the feeding roller unit 130.

The picked up printing media individually pass through the feeding roller unit 130 to be printed upon by passing between the transferring roller 150 and the photosensitive medium 141 of the developing cartridge 140. At this time, a feed sensor 181 detects the printing medium fed between the transferring roller 150 and the photosensitive medium 141. As the printing medium passes between the transferring roller 150 and the photosensitive medium 141, the toner image formed on the photosensitive medium 141 is transferred onto the printing medium.

The printing medium onto which the toner image is transferred moves to the fusing unit 160. The toner image is fused onto the printing medium while the printing medium passes through the pressing roller 162 and heating roller 161. The printing medium, having the images fixed thereon, is discharged by the discharging unit 170 to the outside of the image forming apparatus 10. At this time, a discharge sensor 182 detects the discharge of the printing medium.

Further, it is understood that the first body 20 is rotatable to an open position to expose the printing unit and the features inside the image forming apparatus 10. As such, the developing cartridge 140 and other features disposed in at least the second body 100 are accessible for exchange or replacement. Moreover, the first body 20 may be rotated to the open position so that a paper jam of the printing media along the printing path may be cured. Also, the first body 20 is rotatable to the open position to allow access to the exposure unit 60.

As described above, top surfaces of a scanner and an operation panel are on the same plane in an image forming apparatus according to aspects of the present invention, so it is possible to more effectively use space formed above the image forming apparatus according to aspects of the present invention than in a conventional image forming apparatus. The image forming apparatus according to aspects of the present invention can be used as an ornament.

Additionally, the image forming apparatus according to aspects of the present invention is configured in such a manner that at least one of the width and the length of the scanning unit is equal to the corresponding dimension of the printing unit, and accordingly the image forming apparatus according to aspects of the present invention can be reduced in size compared to a conventional image forming apparatus.

Furthermore, a side wall of space in which a scanning module of a first body moves is formed only by a side wall of the first cover in the image forming apparatus according to aspects of the present invention, so the first body can have as short a length as possible based on the maximum size of a document that can be scanned. In other words, a single side wall enclosing the space in which the scanning module moves is formed, and thus it is possible to minimize the length of the first body rather than the conventional image forming apparatus in which a double side wall is formed.

Moreover, an indicating unit and operation buttons of an operation panel are illuminated only when the image forming apparatus according to aspects of the present invention is turned on, and therefore the image forming apparatus according to aspects of the present invention can be used as an ornament for interior decoration if not used.

Although a few embodiments of the present invention have been shown and described, it would be appreciated by those skilled in the art that changes may be made in the above description without departing from the principles and spirit of the invention, the scope of which is defined in the claims and their equivalents.

What is claimed is:

1. An image forming apparatus, comprising:
    a first body having a scanner which scans an image and includes a scanner cover, and an operation panel disposed at a side of the scanner,
    wherein the operation panel includes a panel cover, and
    wherein a top surface of the scanner cover and a top surface of the panel cover are arranged in a same plane; and
    a second body disposed below the first body to support the first body,
    wherein the first body is rotatably coupled to the second body and pivots between open and closed positions.

2. The apparatus of claim 1, wherein the operation panel is arranged at the side of the scanner in a longitudinal direction of the scanner.

3. The apparatus of claim 1, wherein the operation panel comprises:
    an indicating unit; and
    operation buttons,
    wherein a top surface of the indicating unit and top surfaces of the operation buttons are co-planar with the top surface of the panel cover.

4. The apparatus of claim 3, wherein the indicating unit and the operation buttons are illuminated when the image forming apparatus is turned on, and the indicating unit and operation buttons are not illuminated when the image forming apparatus is turned off.

5. The apparatus of claim 1, further comprising a scanning position indicating member disposed between the scanner and the operation panel.

6. The apparatus of claim 1, wherein the first body has a same width as the second body.

7. The apparatus of claim 1, wherein the first body has a same length as the second body.

8. The apparatus of claim 7, wherein the first body further comprises a first frame cover and a first frame disposed in the first frame cover.

9. The apparatus of claim 8, wherein fastening hooks are disposed on a top surface of the first frame cover to fasten the panel cover thereto.

10. The apparatus of claim 8, further comprising:
    a scanning module disposed to be movable in a longitudinal direction along a reference surface of the first frame,
    wherein an outside surface of the first frame does not protrude above the reference surface of the first frame.

11. The apparatus of claim 10, wherein supporting members are disposed on the reference surface of the first frame extending away from the second body to support a glass substrate.

12. The apparatus of claim 8, wherein an exposure unit is disposed in the first body below a reference surface of the first frame.

13. The apparatus of claim 1, further comprising:
    a scanning position indicating slit disposed between the scanning cover and the panel cover; and
    a scanning position indicating member disposed on an upper side of the scanning position indicating slit.

14. The apparatus of claim 13, wherein a plurality of fastening hooks are disposed about the scanning position indicating slit and fasten the scanning position indicating member thereto.

15. The apparatus of claim 1, wherein the first body comprises a scanning unit, and the second body comprises a printing unit.

16. The image forming apparatus of claim 15, wherein the printing unit includes a removable developing cartridge to develop an image according to image data and a fusing unit to fix the developed image to a printing medium, the developing cartridge and the fusing unit being disposed along a printing path,
   wherein, when the first body is rotated to the open position, the developing cartridge, the fusing unit, and the printing path are made accessible.

17. The image forming apparatus of claim 1, the first body further comprising an exposure unit to expose a photosensitive body to form an electrostatic latent image thereon according to image data, and
   wherein, when the first body is rotated to the open position, the exposure unit is made accessible.

18. An image forming apparatus, comprising:
   a first body formed to have a substantially planar top surface, a scanner, and an operation panel disposed at a side of the scanner,
   wherein the operation panel includes a panel cover, and
   wherein a top surface of the scanner cover and a top surface of the panel cover are arranged in a same plane; and
   a second body disposed below the first body to support the first body and having a bottom surface that is substantially parallel to the substantially planar top surface of the first body,
   wherein the first body is rotatably coupled to the second body to move between open and closed positions.

* * * * *

UNITED STATES PATENT AND TRADEMARK OFFICE
CERTIFICATE OF CORRECTION

PATENT NO.        : 8,036,569 B2                                     Page 1 of 1
APPLICATION NO.   : 11/970013
DATED             : October 11, 2011
INVENTOR(S)       : Kwan-ho Kang It is certified that error appears in the above-identified patent and that said Letters Patent is hereby corrected as shown below:

Title Page Column 1 (Title), Line 2, Delete "CO-PLANER" and insert -- CO-PLANAR --, therefor.

Column 1, Line 2, Delete "CO-PLANER" and insert -- CO-PLANAR --, therefor.

Signed and Sealed this
Fourteenth Day of February, 2012

David J. Kappos
*Director of the United States Patent and Trademark Office*